(No Model.)

W. J. MILLER.
AXLE LUBRICATOR.

No. 509,928. Patented Dec. 5, 1893.

Witnesses
Fred K. Potter
Israel Taylor

Inventor
William J. Miller
By Attorneys
Jacob & Co.

UNITED STATES PATENT OFFICE.

WILLIAM J. MILLER, OF COLORADO CITY, TEXAS.

AXLE-LUBRICATOR.

SPECIFICATION forming part of Letters Patent No. 509,928, dated December 5, 1893.

Application filed May 5, 1893. Serial No. 473,085. (No model.)

*To all whom it may concern:*

Be it known that I, WILLIAM J. MILLER, of Colorado City, county of Mitchell, and State of Texas, have invented certain new and useful Improvements in Axle-Lubricators; and I do hereby declare that the following is a full, clear, and exact description thereof, reference being had to the accompanying drawings, in which like figures refer to like parts.

My invention relates to new and useful improvements in axle lubricators, and consists in the construction and arrangement of parts whereby the axle is continuously lubricated, and the hollow nut which is screwed in the end of the hub bushing and serving for an oil cup may be refilled at any time without removing the wheel, and it will be understood from the following description.

Figure 1:
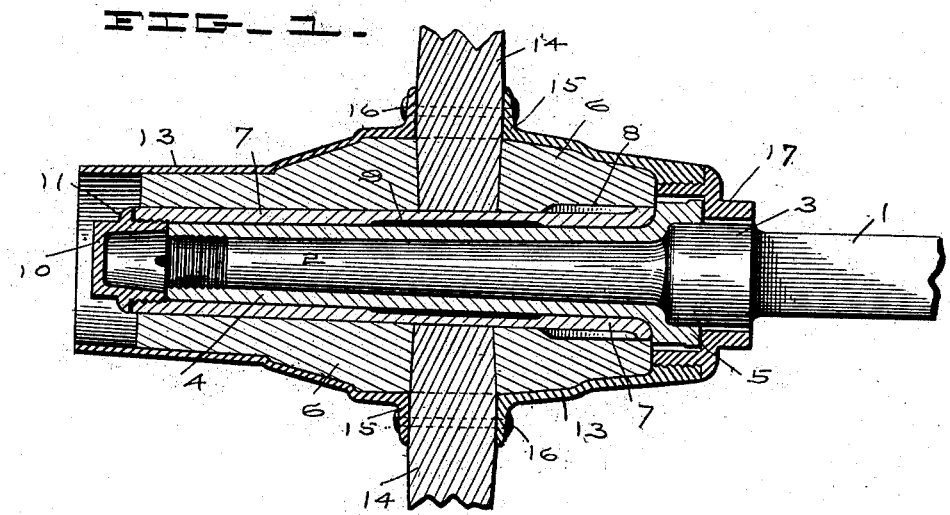
Figure 2:
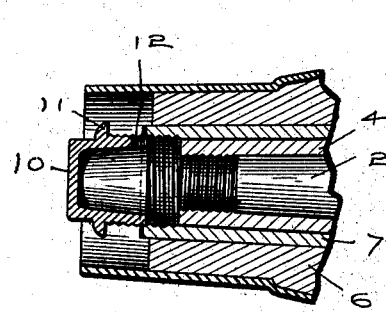
Figure 3:
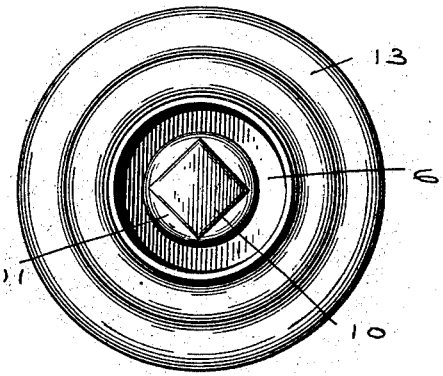
Figure 4:
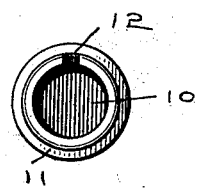

In the drawings, Figure 1 is a longitudinal section of a boxing embodying my improvements. Fig. 2 is a similar view of the outer end of the axle and wheel hub, the lubricating nut partly unscrewed for the reception of oil. Fig. 3 is an end view of the same. Fig. 4 is an inner end view of the lubricating nut.

In detail, 1 is the squared portion of the axle, 2 the tapering spindle, and 3 is an enlargement at its inner end, 4 being the axle skein, which tightly fits the spindle, and being screw threaded in its outer end is screwed on the end of the spindle, the enlargement 5 of the skein fitting closely against the enlargement 3 of the spindle.

6 is the wheel hub, and 7 is its bushing, which is driven tightly in the same, the ribs 8 preventing it from turning.

9 is a channel around the inside of the bushing, and forms an oil chamber when the wheel hub is mounted on the axle, as shown in Fig. 1, where the rear end of the bushing, which is flaring, fits against the enlargement 5 of the axle skein, and the outer end of the bushing extends some distance beyond the end of the axle and its skein, the bushing being screw threaded on the inside of its end for the reception of the hollow nut or cap 10, this nut having a flange 11 which bears against the end of the hub bushing, and also has a notch or opening 12 cut on its inner end, the use of which will be hereinafter described.

13 is an outer metallic collar or covering to the wheel hub on each side of the spokes 14, and having flanges 15, the two being secured together through the spokes by rivets 16. The ends of the collars 13 extend beyond the ends of the hub on both sides, and the inner one is screw threaded on its inside for the reception of the flanged collar 17, this when in position bearing on the end of the enlargement 5 of the axle skein, and thus holding the wheel in position on the axle, as shown in Fig. 1.

The hollow nut 10 which carries the oil supply for the lubrication of the axle is unscrewed as shown in Fig. 2 when it is to be filled with oil, the notch or opening 12 being beyond the end of the hub bushing 7, so that the oil may be readily poured into it, and the interior of the nut and the space between the nut and the end of the axle will be filled, whereupon, as the nut is screwed back into place, the hole through which the oil is poured, is closed, and as the nut is screwed in farther the oil will be forced back between the axle skein and the hub bushing, partly filling the oil chamber formed in such bushing. When the nut is screwed entirely in, the oil chamber will be filled sufficiently, and there will yet remain in the hollow nut enough oil to supply the axle for a long time.

By the construction hereinbefore described, there is no waste of oil, all the parts fitting closely together, and the oil working in between the axle skein and the hub bushing slowly, the oil in the chamber 9 and the hollow nut 10 will last for a long time, keeping the axle lubricated perfectly at all times, and when the nut and the oil chamber become emptied, they can be readily filled by unscrewing the nut 10 until the opening 12 appears, when the oil may be poured in as before described.

The nut 10 may be of any desired size to hold a greater or less quantity of oil, and the construction of my boxing may be modified without departing from the spirit of my invention. For example, the hub bushing 7 may be extended out farther over the end of the axle than shown in the drawings, and a hole made through its top near its end instead of there being a notch in the edge of the hollow nut. The hollow nut could then be filled with oil when it was partly unscrewed with like effect as described, and such hole would be closed when the nut was screwed in.

Having fully described my invention, what I claim, and desire to secure by Letters Patent of the United States, is—

1. In an axle lubricator, a wheel hub having a bushing therein, a hollow nut screwing in the end of such bushing and covering the end of the axle, such nut provided with an opening in its edge, whereby the nut may be filled with a lubricant by partly removing it, the nut when screwed in, closing such opening and forcing the oil between the axle and the hub, substantially as set forth.

2. In an axle lubricator, a wheel hub having a bushing therein, a hollow nut screwing in the end of such bushing and as far as the end of the axle, an oil chamber formed in such bushing, and entirely around the axle, such nut having a notch or opening in its inner edge, whereby the chamber in the bushing and the hollow nut may be filled with a lubricant without removing such wheel or nut, substantially as set forth.

3. In an axle lubricator, an axle with a skein fixed thereon, a wheel hub with a bushing therein fitting such skein, a flanged nut screwing into the rear of the hub, such nut bearing against an enlargement of the axle skein, whereby the opening between such skein and hub bushing is closed, a chamber on the inside of the hub bushing, a hollow nut screwing in the end of such bushing, and provided with an opening in its edges, whereby such nut and the chamber in the bushing may be filled with a lubricant without removing the wheel, substantially as set forth.

In witness whereof I have hereunto set my hand this 25th day of April, 1893.

WILLIAM J. MILLER.

Witnesses:
T. R. CHEATHAM,
J. A. ROBERTSON.